June 14, 1927.
W. C. BULL
1,632,363
SHOCK RESISTING GLASS
Filed March 15, 1926  2 Sheets-Sheet 1
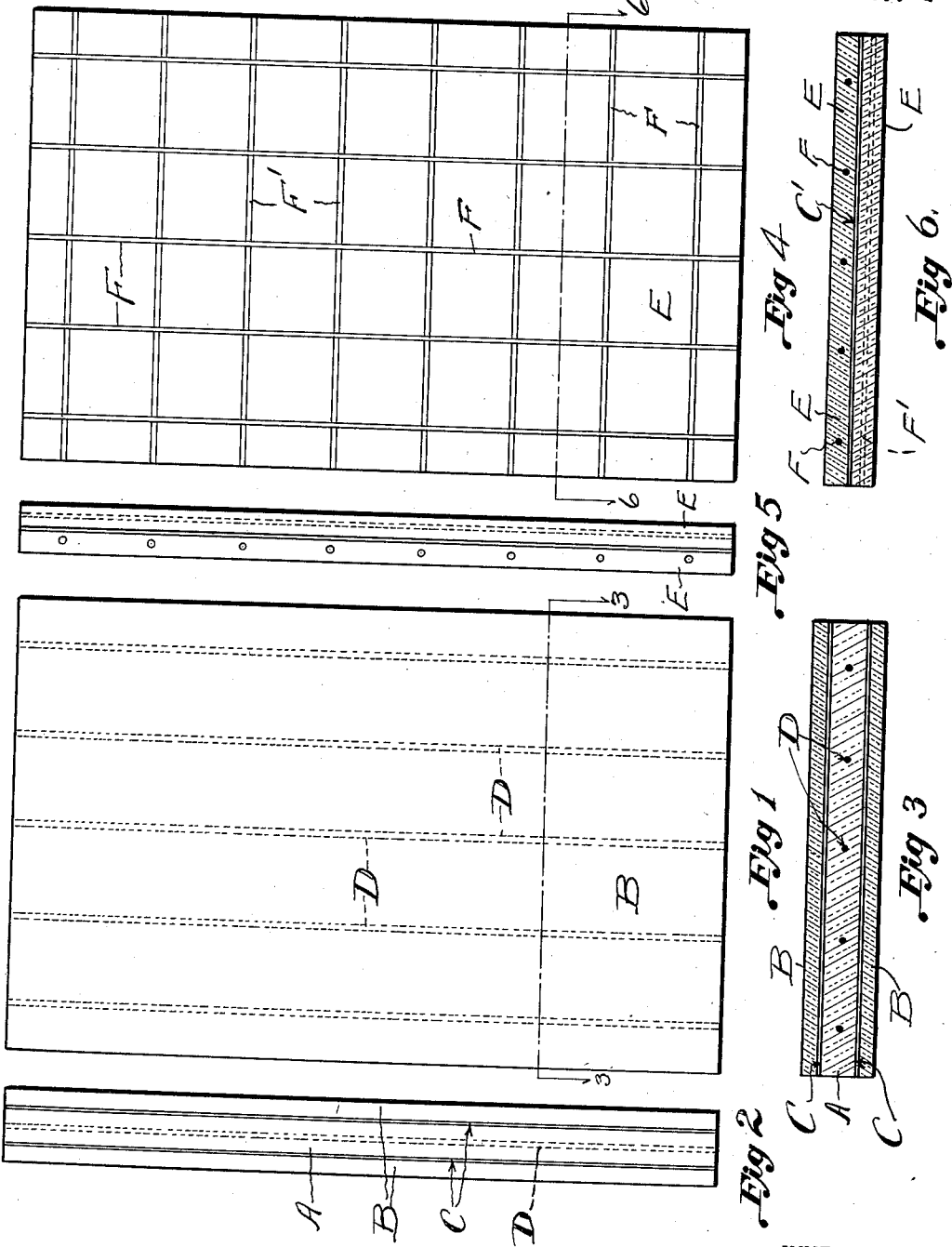
INVENTOR.
WILLIAM C. BULL
BY
ATTORNEYS.

June 14, 1927.  W. C. BULL  1,632,363
SHOCK RESISTING GLASS
Filed March 15, 1926  2 Sheets-Sheet 2
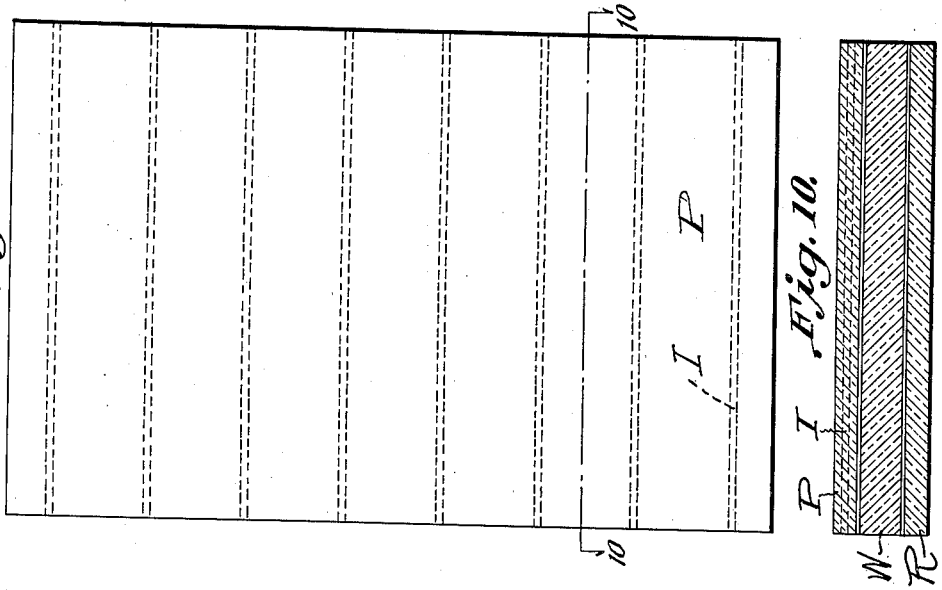
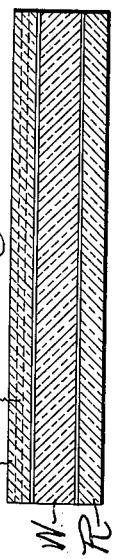
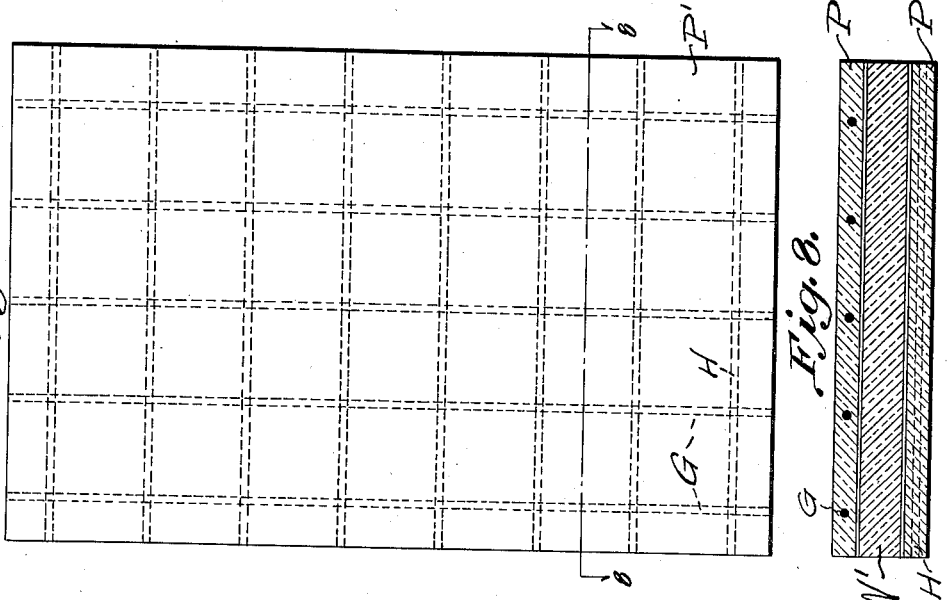
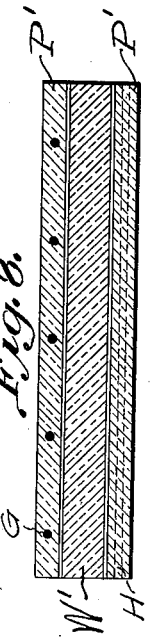
Inventor
WILLIAM C. BULL.
By
Attorney Patented June 14, 1927.

1,632,363

UNITED STATES PATENT OFFICE.

WILLIAM C. BULL, OF BROOKLYN, NEW YORK.

SHOCK-RESISTING GLASS.

Application filed March 15, 1926. Serial No. 94,730.

This invention relates to a novel shock-resisting glass and a method for producing the same.

In its general aspect the invention contemplates a consolidated glass product, consisting of two or more pieces of glass assembled in layers and welded together to provide a laminated glass structure having maximum capacity for resisting shock and also preventing the scattering of the glass in event that the shock or blow is sufficient to crack or break the same. In that connection the invention may be carried into effect by the use of one or more pieces of glass of the same or different thickness according to the character of the product to be made and the condition under which the product is fabricated. For example, relatively thick and thin layers may be used to produce a glass of the desired thickness, or such a combination may be used to obtain the benefit of the inherent flexibility of the thinner sheet and the inherent rigidity or stiffness of the thicker sheet. The use of this combination in the fabrication of glass enables the thinner sheet to conform to any irregularities or unevenness in the thicker sheet or vice versa, when the two sheets are welded together by a binder of pyroxylin or its equivalent.

More specifically however, the invention involves the distinctive feature of a glass product consisting of two or more pieces or layers of glass having within their composition suitably spaced strands of wire of high tensile strength, and the individual layers being united by an interposed layer or sheet of transparent pyroxylin, nitrocellulose or equivalent welding substance. That is to say, the present invention contemplates a product combining the advantages of wire reinforced glass and bullet-proof scatterless glass of the type consisting of laminated layers united or welded together by a transparent binder of the character set forth.

Accordingly, it will be apparent that one of the objects of the present invention is to provide a new article of manufacture in the form of a transparent laminated glass product having great resistance and strength due to the incorporation of the transparent cellulose material or its equivalent between the surfaces of the glass sheets and the wires embedded in the sheets themselves, whereby when a unit including these elements is subjected to heat and pressure in a suitable device, such as for example, that shown in my former Patent No. 1,553,667, granted September 15, 1925, will be produced a consolidated glass product having maximum capacity for resisting the shock of a blow or a missile, such as a bullet or similar force intended to puncture or destroy said material used as a screen or enclosure for a vehicle, a compartment, or for partitions when used to protect persons or valuable property.

Another object of the invention is to provide a shock resisting glass of maximum strength and rigidity and which is much lighter than glass of this character heretofore made, thereby providing considerable advantage in favor of the use of glass of this type in transportation vehicles where the weight per mile travel is taken into consideration.

A further and important object of the invention is to provide a method for making glass of the character set forth at a greatly reduced cost. That is to say, the present invention contemplates a method of making the glass whereby wire reinforced bullet-proof, scatterless laminated glass may be made at a saving of approximately 50% of the present cost of manufacture of the merely laminated type of bullet-proof glass alone, while at the same time making greater protection possible and at less operating costs to manufacture the completed article.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:

Figure 1 is a plan view of a portion of glass made in accordance with the present invention.

Figure 2 is a side elevation of the glass shown in Fig. 1.

Figure 3 is a horizontal cross-sectional view taken on the line 3—3 of Fig. 1.

Figure 4 is a plan view showing a modified form of construction.

Figure 5 is a side elevation of the type of glass shown in Fig. 4.

Figure 6 is a horizontal cross-sectional view taken on the line 6—6 of Fig. 4.

Figures 7 and 8 are respectively a plan and a sectional view (taken on line 8—8 of Fig. 7) of a modified form of glass product having sheets of different thickness.

Figures 9 and 10 are respectively a plan and a sectional view (taken on the line 10—10 of Fig. 9) showing a still further modified form of construction utilizing sheets of glass of different thickness.

Similar reference characters designate corresponding parts throughout the several figures of the drawings.

A consideration of prime importance in connection with the present invention is the provision of a new article of manufacture of the type set forth which may be made at less cost than other products heretofore employed for protecting persons and property, while at the same time providing a material of much reduced weight while having the added feature of augmented strength and power of resistance.

In the provision of a laminated glass structure having interior reinforcement in the form of strands of wire, it will be noted that when the said strands are embedded within the glass sheets and form an integral part of the glass structure, they have the property of picking up vibrations caused by shock or blow on the face of the glass and transmit or distribute these shock vibrations along the course of the wires, thus effectually dissipating shock vibration away from the point of impact, and thereby avoiding the concentration or focusing of the percussion shock in the immediate area where the blow occurred.

By reference to the drawings it will be observed that Figs. 1, 2 and 3 illustrate a laminated glass structure which includes a central or core sheet designated generally as A having the outer sheets B welded thereto by a suitable binder C, hereinafter more fully referred to. In a structure of the type set forth in these figures the core member A is clearly of greater strength and rigidity than the members B due to its greater thickness, and therefore the members B have more or less inherent flexibility adapting them to conform readily to the core member A when subjected to heat and pressure to assure cohesion between the layers due to the intervening binder C.

Referring further to the product of Figs. 1, 2 and 3 it will be observed that the core member A has embedded therein suitably spaced parallel strands of wire D, the spacing and arrangement being such as to give maximum visibility while at the same time materially reinforcing the structure. The wires D are of suitable gage and high tensile strength and as previously indicated are so arranged as to form the least obstruction to vision. When the glass core A is combined with one or more of the glass sheets, as for example B, by the intervening sheet C of transparent nitrocellulose or the like, the consolidated product will possess substantial shear resisting properties against sudden shock to the assembled components.

Another and practical form or embodiment of the invention is shown in Figs. 4, 5 and 6 of the drawings wherein sheets of glass E of substantially the same thickness and having the reinforcing wires F and F' embedded therein may be united or welded together by a suitable transparent binder C'. In this type of product the layers of glass may be assembled one to the other in such a way that the wire strands F and F' are at right angles to each other, although obviously any other angle or relationship between the strands of juxtaposed layers may be used without altering the character of the invention. However, where a multiple strand wire-reinforced consolidated glass product is used, the square mesh type of reinforced glass formed in the manner indicated offers less obstruction to vision, and is therefore most desirable.

From the foregoing it will be apparent that the strands of wire within the glass structure have the property of picking up the excessive shock stresses, beyond the capacity of the glass to withstand and transmit the strains along the wires, materially strengthening the glass structure into a more substantial unit for resistance, but when a structure of this nature is welded securely to a strong layer of material of a cellulose nature, possessing much greater shear resistance to both sides when used as an interposed membrane, it is readily seen how a shock is blanketed and very material vibrations are prevented from having so destructive effect upon the layer of glass beyond. The wire strands serve to hold secure any fractured glass from separating from the structure, since fractures radiate from the point of percussion, which fact in connection with the welding of the layers of glass to the membranes a very substantial structure is developed.

In making either of the forms of product above outlined the method employed in the manufacture thereof is substantially the same and is briefly as follows:—

First, the contact surfaces of the glass are coated with a transparent hard drying film possessing strong adhesive properties such as casein, glue, or fish bladder, neutralized to the influence of hygroscopic conditions. An example of the adhesive coating for the contact surfaces of the glass is casein, gelatine or fish bladder refined in the proportions of 28 grams thereof to 226 grams distilled water and 20 drops ansol panciana. After this coating is applied it is allowed to thoroughly dry.

The next step involves the consolidation of the nitrocellulose sheets or their equivalent with the coated contact surfaces of the glass and in order to prepare such binder sheets for use they are immersed in a combination of volatile alcohols, an example of such combination being: 236 parts amyl alcohol, 177 parts butylic alcohol, 22 parts methyl alcohol, 15 parts glycol-diacetate, 5 parts transparent vegetable oil.

At the time of assembling the glass and cellulose sheets, the dry coated surfaces of the glass must be submerged in the alcohol solution referred to together with the cellulose, care being observed to dissipate any bubbles which may have formed. The glass and intermediate membrane or binder are then superposed according to the thickness of product desired, and the consolidated aggregate is at once placed upon a conveyor or the like and passed through the side walls of a heat treating oven wherein the consolidated product is placed between the platens of a multiple press device of the type referred to in my former patent. The product is then subjected to evenly distributed heat and pressure simultaneously, and during the pressing operation currents of heated air are caused to travel prescribed paths between and about the press units, as well as the heating units due to the circulating influence of a propelling fan of large capacity. Also, the arrangement is such that any vapors or gases emanating from the materials under treatment are conducted away not only to assure a dry condition of the product, but also to insure a proper factor of safety during the operation of the device.

One of the essential prerequisites to obtaining a good product involving the foregoing elements is to exclude moisture from the material during the cementing operation. Moisture not only interferes with the adhesive action of the cementing agent but also hinders the exhausting or expelling of excess solvent, gases, and combined air; and furthermore, if absorbed by the cellulose material produces flaws and otherwise affects the homogeneity and transparency of the product. Another important consideration in the manufacture of this type of glass is to subject the laminated unit to uniform pressure and heat throughout the entire area of each unit in order to obtain a complete uniform adhesion of the glass to the cementing agent to insure a product possessing the desired standard of perfection as well as strength or power to effectually resist shock, jar, or penetration, and also insuring the necessaray adherence of the fragments of glass to the inherent binder in case of breakage.

In practice it has been found that this process gives more satisfactory results and the consolidated units may be formed in a rapid and facile manner. In fact an operating period for processing the components may be consumated during a period of fifteen minutes subjection to the heating and pressure within the oven.

The product resulting from the foregoing process, and heretofore described can be made much lighter, while at the same time being of greater efficiency due to the combination of the wire reinforced glass with the layers of glass consolidated by a transparent membrane which welds the sheets together under the influence of heat and pressure. Heretofore glass of this type has had a weight of 10 lbs. per square foot and upwards, but with the present type of wire reinforced and laminated glass it is possible to obtain a product having an approximate weight of 6 or 7 lbs. per square foot. Where glass of considerable area is used, it will be apparent that the saving is quite material and therefore the invention is of particular importance from an economic standpoint. Furthermore, the strength and resistance of the glass is increased.

In connection with the product shown in Fig. 1 it will be observed that the article of manufacture there disclosed is in the form of a laminated glass sheet comprising the relatively thick sheet of glass A combined with a relatively thin sheet of glass B, secured to the surface of the relative thick sheet of glass A by a suitable binder C filling the entire space between the surface of the glass sheets, and the relative thin sheet of glass being bent to conform to the general contour of the thick sheet and permanently held in such relation.

Figures 7 and 8 of the drawings show a still further modification of the invention, the same embodying a thick core W' of plain glass and two sheets of relatively thinner glass P'—P' welded to opposite sides thereof, and each having therein wire-strands G and H. These strands are preferably arranged in the cross relation also illustrated in Figures 4, 5 and 6 of the drawings.

Figures 9 and 10 of the drawings illustrate a further modification of the invention, the same showing a laminated glass product having a thick core W of plain glass, a thinner sheet of plain glass R, and a sheet of wire-strand glass P, the wire strands I preferably running parallel to each other within the sheet in which they are embedded.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. As an article of manufacture, a laminated glass product composed of sheets of glass held together by a transparent membrane and at least one of said sheets containing therein only spaced strands of disconnected wires in non-crossing relation.

2. As an article of manufacture, a laminated glass product composed of sheets of glass held together by a transparent membrane and at least one of said sheets containing therein only spaced parallel strands of disconnected wires in non-crossing relation.

3. As an article of manufacture, a laminated glass product comprising sheets of glass held together by a transparent membrane in which each of the glass sheets contains spaced parallel wires only, the wires of one sheet crossing those of another sheet at an angle.

In testimony whereof I hereunto affix my signature.

WILLIAM C. BULL.